(No Model.)
H. OGBORN.
CULINARY VESSEL.
No. 269,313. Patented Dec. 19, 1882.
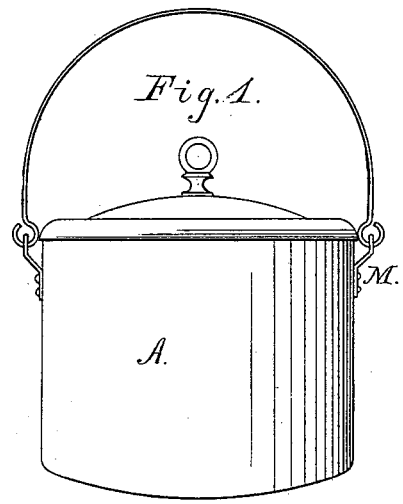
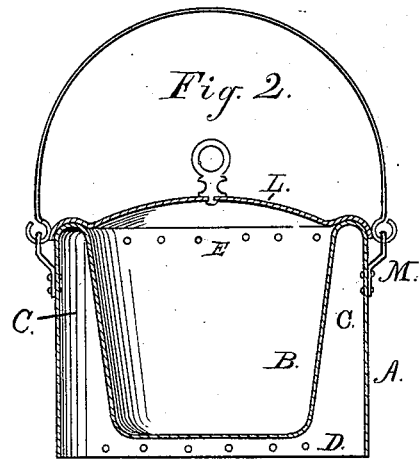
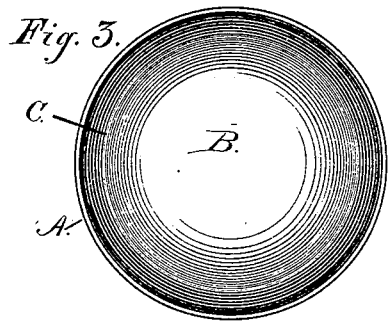
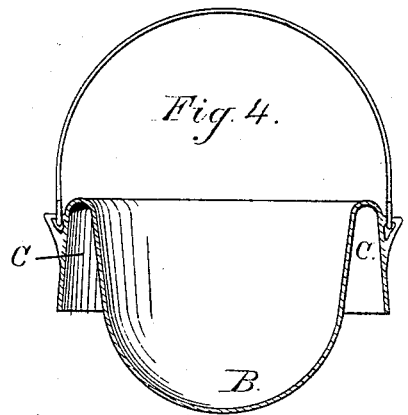
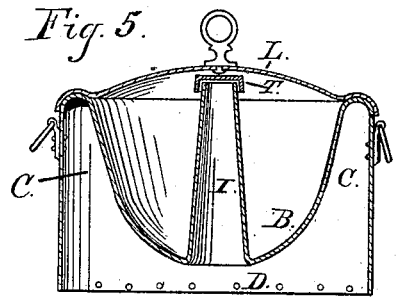
Witnesses,
Addison H. Study.
Wm H. Ogborn.
Inventor,
Harrison Ogborn.

UNITED STATES PATENT OFFICE.

HARRISON OGBORN, OF RICHMOND, INDIANA, ASSIGNOR TO RHODA C. OGBORN AND RALPH W. NYE, OF SAME PLACE.

CULINARY VESSEL.

SPECIFICATION forming part of Letters Patent No. 269,313, dated December 19, 1882.

Application filed June 7, 1882. (No model.)

*To all whom it may concern:*

Be it known that I, HARRISON OGBORN, a citizen of the United States, residing at Richmond, in the county of Wayne and State of Indiana, have invented certain new and useful Improvements in Culinary Vessels; and I do hereby declare the following to be a full, clear, and exact description of my invention, such as will enable others skilled in the art to which it appertains to make and use the same, reference being had to the accompanying drawings, and to letters of reference marked thereon, which form part of this specification.

My invention relates to that class of culinary vessels in which an inner vessel of metal, glass, stone, china, crockery ware, or other suitable materials is inclosed in an outer casing, so as to form an air-chamber between the case and vessel for catching and holding or retaining the heat around and in contact with the entire bottom and sides of said inner vessel.

The invention therefore consists in novel features of construction, all as will be hereinafter fully described, and set forth in the claims hereto annexed.

In the annexed drawings, which fully illustrate my invention, Figure 1 is an exterior view of a culinary vessel embodying my improvements, showing the completed vessel, cover, bail, &c. Fig. 2 is a vertical section of the same. Fig. 3 is a bottom view thereof. Fig. 4 is a modification thereof, adapted to be used in boiling water, sap, juices, &c. Fig. 5 is a vertical section of a modification adapted to be used for baking bread, cakes, &c.

Like letters of reference indicate corresponding parts in the different figures.

The inner vessel, B, and casing A are made of metal, stone, china, earthen ware, or other suitable materials, and in any desired form and size; but the vessel is preferably tapered from above inward and downward. (See Fig. 2.) The case A is curved outward to form a convex strengthening-rim for the reception of a cover having a similar annular groove, and thence downward, as shown in Figs. 2 and 4, and to a greater depth vertically than the bottom of vessel B, and affords a firm support for it. It also forms the outside of a hot-air chamber that surrounds the vessel B on the sides and bottom for retaining and utilizing the heat when the vessel is placed on a hot stove or other heating surface, or it may be placed on a vessel of boiling water, in which case the chamber becomes a steam-chamber.

In making my invention it may be cast in a single piece complete, or it may be made of a single piece of sheet metal and struck up with dies, and the vessel B and casing A formed at the same time. (See Fig. 2.) My invention is also made of earthen, stone, and china ware, glass, or other suitable materials. When thus made the materials are pressed, molded, or otherwise formed into suitable shape and size in a single piece, and treated in all respects like other ware of that class. The vessel is provided with bails or handles, or any convenient means for lifting it.

The operation of the invention is as follows: The vessel B, containing the food to be cooked, being placed on a hot stove or other heated surface, with the cover in its place, the casing A incloses and covers a large area of the hot surface upon which it rests. Hot air will immediately fill the chamber C and distribute itself through the contents of the vessel B, as it has direct access to the vessel B, over its entire bottom and sides, and will also pass through vessel B above the top of the food being cooked, and thus form a hot-air chamber in the top of the vessel between the food and the cover and bring the heat in direct contact with every part of the food and cook it rapidly and uniformly, without burning it or having to stir it constantly to keep it from burning, as is the case in vessels that come in direct contact with hot surfaces. The stirring of food takes much valuable time and greatly damages it, as it breaks the particles, expels the air, and tends to make it pasty and heavy.

My invention is especially adapted to be used for cooking rice, grits, puddings, pies, sauces, sweetmeats, and cakes, preserving and canning fruits and vegetables, boiling and evaporating juices, sap, &c., and numerous other uses easily suggested by those skilled in the culinary art, to which my invention belongs.

I construct both forms of my invention with and without the perforations D E, as the case may require.

Having thus described the nature, construction, and operation of my invention, what I claim therein as new and useful, and desire to secure by Letters Patent, is—

1. The herein-described culinary vessel, consisting of the case A, having a convex upper rim and an interior suspended vessel, B, cast or formed integral with said case, and having perforations through it, near the upper end thereof, substantially as specified.

2. The herein-described culinary vessel, consisting of outer casing, A, interior vessel, B, and intermediate upper convex connecting-rim, all cast or formed integral with each other, and an annular grooved cover, substantially as specified.

3. The within-described culinary utensil, composed of a vessel, B, and case A, and having perforations E near the top of vessel B, and perforations D at or near the bottom of case A, for the purposes and uses substantially as herein shown and described.

HARRISON OGBORN.

Witnesses:
W. E. BELL,
JOHN HOWARTH.